March 24, 1970 TAKEO KATO ET AL 3,502,197
ACCUMULATING CONVEYOR
Filed Dec. 8, 1967
8 Sheets-Sheet 1

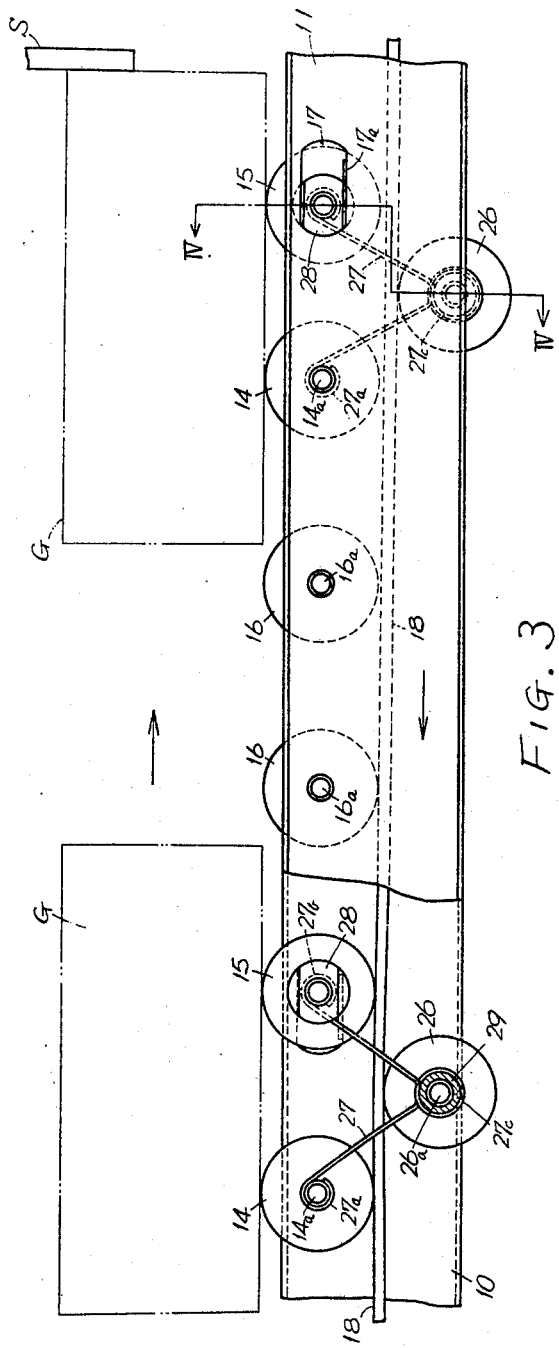

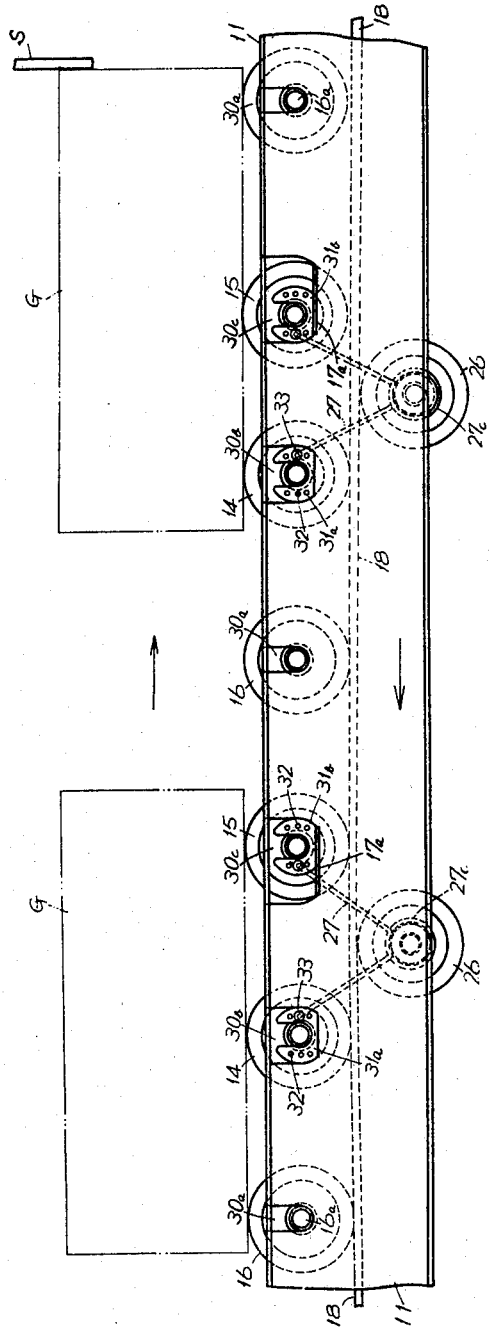

March 24, 1970  TAKEO KATO ET AL  3,502,197
ACCUMULATING CONVEYOR

Filed Dec. 8, 1967  8 Sheets-Sheet 5

INVENTOR
T. Kato et al

BY *Robert E. Burns*
ATTORNEY

March 24, 1970   TAKEO KATO ET AL   3,502,197
ACCUMULATING CONVEYOR

Filed Dec. 8, 1967   8 Sheets-Sheet 7

INVENTOR
T. Kato et al

BY *Robert A. Burns*

ATTORNEY

United States Patent Office 3,502,197
Patented Mar. 24, 1970

3,502,197
ACCUMULATING CONVEYOR
Takeo Kato, 3-1724 Kamimeguro, Meguro-ku, Tokyo, Japan, and Toshiyuki Takahashi, 4327 Totsuka-cho, Totsuka-ku, Yokohama-shi, Kanagawa-ken, Japan
Filed Dec. 8, 1967, Ser. No. 689,031
Claims priority, application Japan, Dec. 10, 1966, 41/80,906
Int. Cl. B65g 13/02
U.S. Cl. 198—127                         5 Claims

ABSTRACT OF THE DISCLOSURE

Accumulating roller conveyor having combination conveyor rollers, pressure rollers and an endless driving belt adapted to release its driving engagement with the overlying conveyor rollers when an article carried on the rollers is forced to stop its forward movement in the course of conveying operation. The combination conveyor rollers are connected by a spring bracket which is formed suitably to move one of the combination rollers longitudinally of the conveyor path.

---

This invention relates to an accumulating roller conveyor and more particularly to a conveyor in which the conveyor rollers are driven by engagement of an endless driving belt therewith.

In roller conveyors of accumulating type, as heretofore constructed, it has been a problem of great concern to provide an effective mechanism for automatically halting the travel of the articles that are being conveyed on the conveyor rollers. One previous attempt at providing such mechanism involved the use of a device adapted for detecting a stoppage of the articles carried on the rollers whereupon the belt drive mechanism is dictated to stop its operation or to be isolated from the belt assembly. In this type of the roller conveyors, however, it is extremely difficult to bring a full stop to the belt drive mechanism concurrently with the detection of the articles which have ceased their movement. The time delay existing between the detection of the articles at rest and the termination of the belt run causes excess friction between the articles, conveyor rollers, driving belt and other associated parts. As a result, the component parts of the conveyor are more or less heated and accordingly worn out earlier and at the same time the articles handled by this conveyor tend to be lessened in quality.

Another difficulty encountered by this type of the prior art conveyor is the necessity for repeated actuations of the belt drive mechanism as the article resumes its forward movement after a certain time length of stoppage. It is no doubt advantageous for the performance efficiency of the conveying operation to have a belt drive mechanism such that operates uninterruptedly even while the articles carried on the rollers are held at rest.

There is also known an accumulating roller conveyor having such driving rollers that are vertically movable depending on the behaviors of the articles carried thereon, in which when an article hits a stop or the preceding article and is moved upward, the underlying roller is also moved upward by, for instance, the spring action to release its driving engagement with the underlying belt. In this instance, however, it is impossible to utilize free rollers which are not directly associated with the driving power and the use of which is conventional in the conveyor art for its economy in production. It follows that the conveyor of this type requires an increased number of specially constructed, costly rollers which are apparently inimical to the economy of production.

This invention therefore contemplates at providing a novel and improved accumulating roller conveyor system to remove these and other drawbacks which are inherent in the existing counterparts.

It is an important object of the invention to provide an accumulating roller conveyor in which the driving power exerted on the conveyor rollers can be released or modified directly by the stoppage of one or more articles carried thereon, wherein the articles following the article stopped are not subjected to unusual frictional force.

It is also an important object of the invention to provide an accumulating roller conveyor in which the belt drive mechanism operates continuously in spite of the presence of one or more rollers which have been released of the engagement with the driving belt, so that the repeated stops and starts of the belt drive mechanism are completely avoided.

The accumulating conveyor according to the present invention utilizes combination conveyor rollers comprising main, coordinating and free rollers, each different in function and mode of mounting. The main roller is connected by means of a spring bracket with the adjacent coordinating roller, the bracket being further connected with a pressure roller underlying the driving belt running underneath the conveyor rollers. The main and free rollers are rotatably journalled at their ends in the frame side rails which are mounted in spaced parallel relationship with each other. The coordinating rollers on the other hand are borne at their shafts on the side rails by means of horizontally elongated openings slotted in the rails, so that the coordinating rollers can be moved forwardly and backwardly of the conveyor path. The spring bracket connecting the main, coordinating and pressure rollers is shaped generally in the letter V with its upper ends wrapping the outer periphery of the shafts of the adjacent main and coordinating rollers and with its lower end wrapping the outer periphery of the shaft of the pressure roller. The pressure rollers are held in firm contact with the lower surface of the overlying driving belt by the spring action of the bracket, with the result that the belt is forced against the rollers while in conveying operation. In the event the article carried by the coordinating roller is forced to stop and gives rise to the frictional force exerted in between the article and the coordinating roller, the roller is forcibly moved backwardly of the conveyor path, viz, in the direction of the forward movement of the belt. As the result, the coordinating roller is drawn near to the main roller to add to the distance between these two rollers and the corresponding pressure roller underlying the former. The coordinating rollers are borne on the outwardly bent edge of the horizontally elongated slots in the side rails by means of bearings made of a lubricous plastic material and configured suitably to accommodate the shafts of the coordinating rollers in slidable engagement. The pressure roller has on its outer periphery of the shaft a plug of plastic material which is adapted to reduce the frictional force occurring between the rounded portion of the spring bracket and the outer periphery of the shaft of the plug.

Other objects, features, and advantages of the present invention will become apparent from the subsequent description taken in conjunction with the accompanying drawings, in which:

FIG. 3 is a side view of a portion of the conveyor system of FIG. 1, which is shown on an enlarged scale to illustrate general arrangements of the combination rollers and the spring bracket connecting the same;

FIG. 6 is similar to FIG. 3, but showing a modification of the accumulating conveyor according to the invention;

Figure 2:
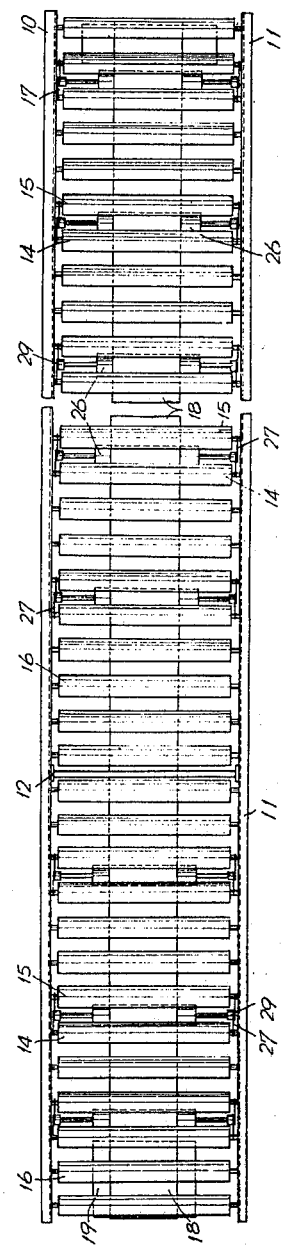
FIG. 2 is a top plan view of the conveyor system shown in FIG. 1.
Figure 1:
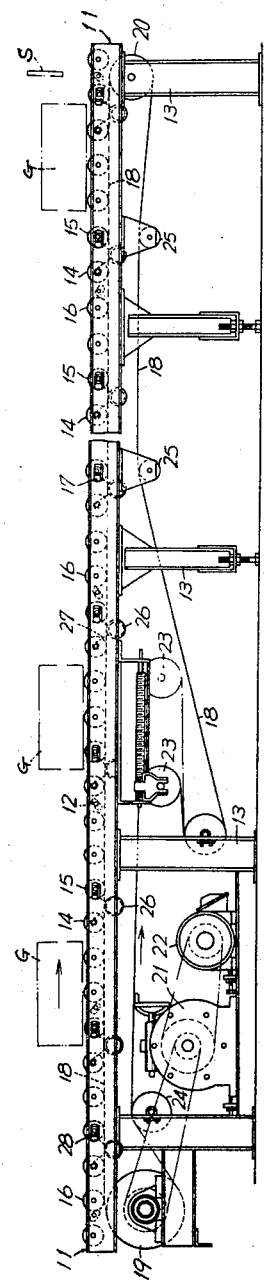
FIG. 1 is a side view showing the general organization of the conveyor system according to the invention.

The conveyor, as best shown in FIGS. 1, 2 and 3, comprises a frame having side rails 10 and 11 which are generally channel shaped in cross section, although any other desired type of structure member could be employed. The side rails are connected by spaced cross members 12 which hold the said members in parallel spaced relationship with each other to define a path along which the articles are to be moved. Designated at 13 are legs which are suitably braced and attached to the side rails 10 and 11 to support them at a proper level in horizontal position.

The articles to be moved, such as packages, boxes, or the like, designated by "G" in the drawings, are supported on a plurality of combination conveyor rollers 14, 15 and 16 which extend between the side rails 10 and 11 of the frame and which are mounted for rotation on their own axes. The rollers 14, 15 and 16 are herein referred to as main rollers, coordinating rollers and free rollers, respectively, according to their specific functions. As shown, each of the main and free rollers 14 and 16 is journalled on the shaft 14a and 16a having circular end portions which fit into correspondingly shaped openings in the side rails 10 and 11, while each of the coordinating rollers is longitudinally movably borne on the rails at the end portions of the shaft projecting from the roller body by means of the longitudinally elongated slots in the rails. The conveyor rollers may project above the tops of the frame side rails 10 and 11, as shown, or could, if desired, terminate below the tops of the side rails which could then function as guides to retain articles in the desired conveyor path.

The main and coordinating rollers 14 and 15 are driven by an endless belt 18. As shown in FIG. 1, the belt passes over two guide pulleys 19 and 20 provided at the ends of the conveyor and at least one of them is power driven by a reducer 21 coupled with a motor 22. By preference, the belt 18 may also pass over a take-up pulley 23, tightening pulleys 24 and return idlers 25 for the purpose of securely tensioning the belt in its return run, as is conventional in the art. The belt 18 is driven in the direction opposite to the advance of the articles.

The belt 18 is held in driving engagement with the main and coordinating rollers 14 and 15 by a plurality of pressure rollers 26 which are arranged in spaced parallel relationship with each other. Each pressure roller 26 is connected at its projecting shafts with the rollers 14 and 15 by means of a spring bracket 27 which is later to be described.

The conveyor rollers 14, 15 and 16 are of cylindrical shape and are arranged in spaced parallel relation with their axes normal to or at right angles to the frame side rails 10 and 11.

Figure 5:
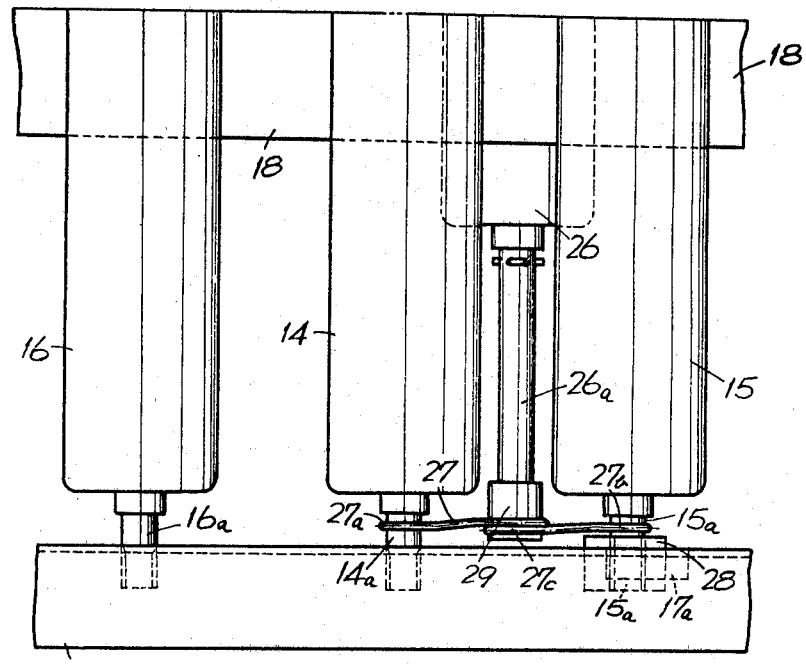
FIG. 5 is a top plan view corresponding to FIG. 4.

As seen from FIGS. 3 and 5, the main and free rollers 14 and 16 comprise shafts 14a and 16a, respectively, which extend outwardly from the ends of the rollers body and which are journalled into the correspondingly shaped openings in the frame side rails 10 and 11.

The means for mounting the coordinating roller 15 to the side rails 10 and 11 comprise shafts 15a extending outwardly from the ends of the roller body and antifriction bearings 28 each having a hole 28a into which is forced the tip of the shaft 15a. The bearings 28 may be made of, such as for example, polyacetal or polyamide.

Figure 4:
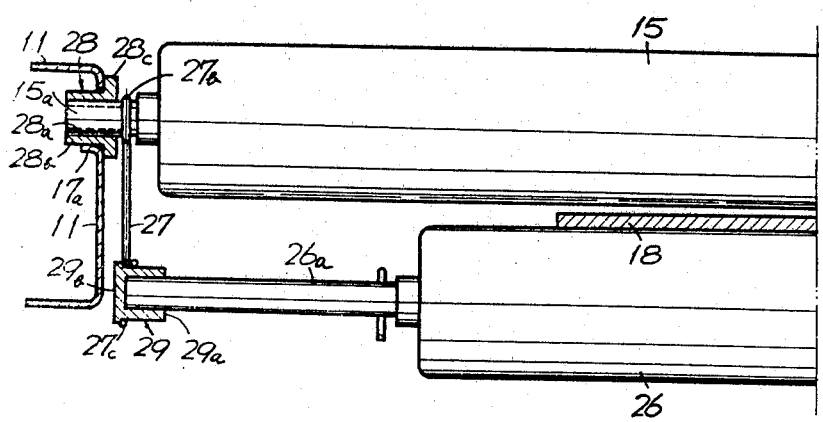
FIG. 4 is a sectional view taken along the line IV—IV of FIG. 3.
Figure 8:
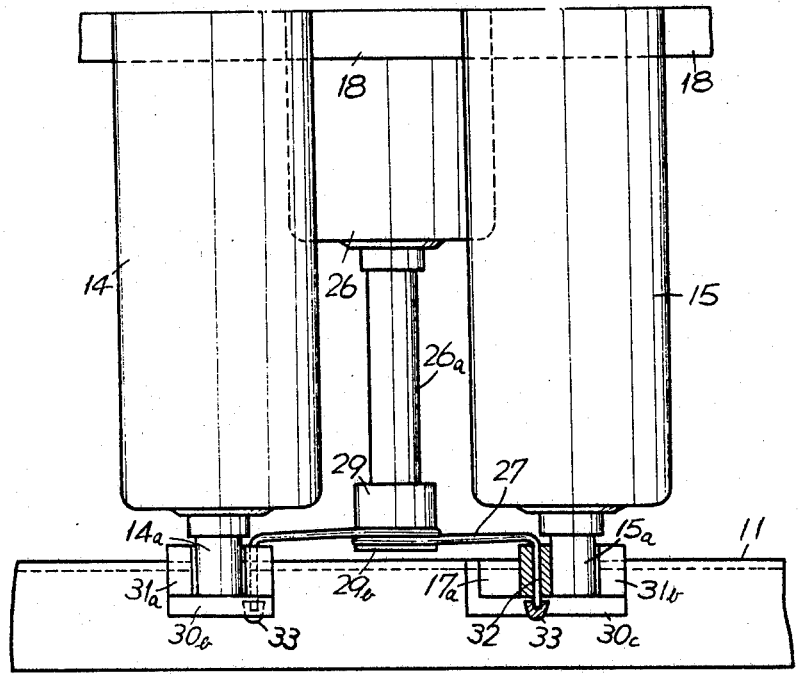
FIG. 8 is a top plan view corresponding to FIG. 7.
Figure 7:
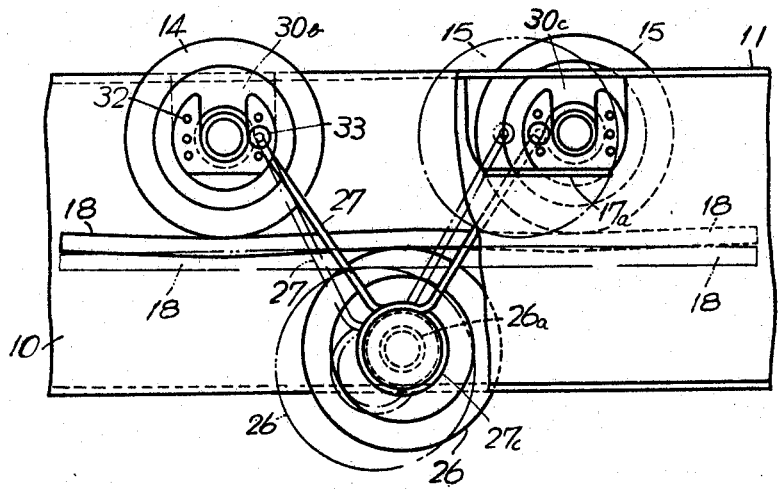
FIG. 7 is a side view showing the operation of the main, coordinating and pressure rollers, each connected by the spring bracket.
Figure 9:
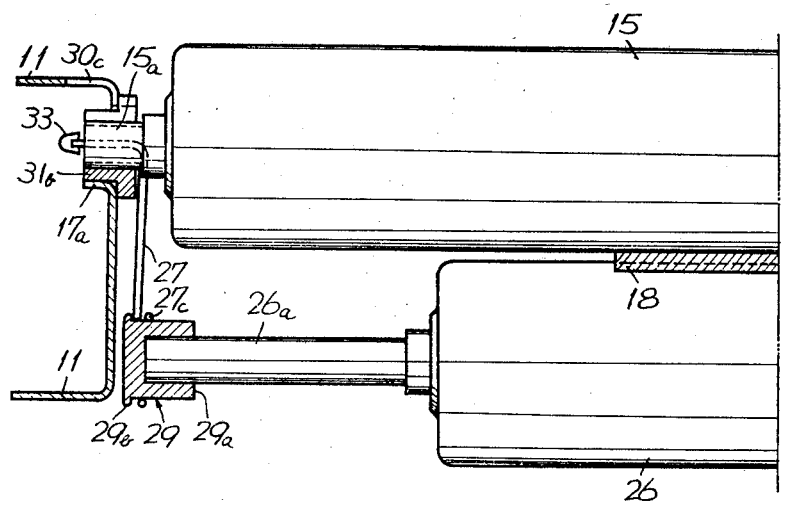
FIG. 9 is a fragmentary view showing the mounting of the rollers and the belt between them.

Longitudinally elongated slots 17 are provided in the side rails 10 and 11 as illustrated in FIGS. 3 and 4, the lower edge of each slot being bent outwardly to form a bearing support 17a. The shaft 15a of the coordinating roller 15 is inserted at and by means of the bearing 28 into the slot 17 in a slidable engagement.

To prohibit an accidental movement of the shaft in a direction rectangular to the direction of the conveyor transport, a flange 28c is provided at the inner end of the bearing 28.

The pressure roller 26 comprises a cylindrical roller body, shafts 8a extending outwardly from the ends of the roller body and mounting plugs 29 each having a cavity 29a which securely receives the tip of the shaft 8a and having a flange 29b to prohibit the disarray and accidental movement of the pressure rollers in a direction rectangular to the advance of the conveyor belt. The plugs 29 may be made of plastic materials of self-lubricous nature.

The pressure roller 26 is carried in dependence from the shafts 14a and 16a by means of a V-shaped spring bracket 27 of resilient metal. As best shown in FIG. 3, the bracket 27 has its middle portion formed in a hoop so as to rotatably wrap the outer periphery of the plug 29 of the pressure roller and each of its end portions formed in a hoop to retain rotatably either of the shafts 14a and 16a. The bracket thus arranged functions while in the conveying operation in such a manner as to force the coordinating roller 15 away from the associated main roller 14, viz, in the direction in which the articles carried on the rollers advance.

The main and coordinating rollers 14 and 15 are, as described, so arranged that they are driven directly by the underlying conveyor belt 18 which is power driven by the motor 22. It will be appreciated that if the belt travels in its return run in the direction of arrow as shown in FIG. 1, the rollers are turned clockwise when viewed from above the drawing, viz, the articles carried on the rollers are moved in the same direction as the returning belt. The belt underlying the rollers and in driving position is arranged in such a manner that it can move vertically, viz, it can be slackened to a predetermined extent, thereby making it possible to regulate the amount of the frictional force exerted between the belt and rollers thereby to adjust the driving pressure of the belt against the rollers. The tension in the belt can be adjusted, if desired, by the manipulation of the take-up pulleys 23, tightening pulley 24 and return idlers 25.

The vertical displacement of the belt in the driving position is adjusted by the upward or downward motion of the underlying pressure rollers 26 working in cooperation with the associated main and free rollers 14 and 16 by way of the spring bracket 27.

When, now, the belt is driven to travel in the direction of arrow as shown in FIG. 3, the coordinating roller 15 is moved forward to the rightmost edge, when viewed from above the drawing, of the longitudinally elongated slot 17 in the frame side rail by the spring action of the bracket 27, with the result that the pressure rollers 26 are raised to press the belt 18 tightly against the main and free rollers 14 and 16. The belt 18 is thus held in abutting relation with both the pressure rollers 26 and the main and free rollers 14 and 16. As the belt is moved in the direction of arrow as shown in FIG. 3, therefore, the main and free rollers 14 and 16 are forced to turn clockwise so that the articles carried on the rollers are conveyed in the direction opposite to the advance of the driving belt, as illustrated by an arrow in FIG. 3.

Designated at G and S are, respectively, the article carried on the rollers for conveyance and a stop adapted to terminate the advance of the article when desired. At the moment the article G hits the stop S in the course of conveying operation and discontinues to advance, the belt nevertheless continues to move and drive the overlying rollers 14 and 15. As the result, there takes place considerable amount of frictional force inbetween the belt and the overlying rollers, with the result that the rollers 14 and 15 are subjected to a braking effect that works on the rollers to turn them counter clockwise. It follows that the shaft 15a is moved backwardly to the leftmost edge, when viewed from above the drawing, of the longitudinally elongated slot 17, at which time the spring bracket 27 acts to depress the associated pressure roller 26 downwardly through the anti-friction plastic plug 29 which is adapted to connect the bracket and the shaft of the pressure roller 26.

The pressure roller 26 thus lowered in its relative position functions to slacken the driving belt 18 so as to reduce the frictional force that has been present between the belt and pressure rollers, thereby releasing the abutting engagement therebetween.

As soon as the stop S is isolated from the conveyor line and permits the article G to resume its forward movement, each coordinating roller is forced forwardly of the conveyor path so that the pressure roller 26 is forced upwardly by the spring action of the bracket 27, thereby restoring the normal conveying operation.

FIGS. 6 to 9 illustrate an alternative embodiment of the roller conveyor according to the present invention which may be utilized, other parts therein corresponding to like parts in FIGS. 1 to 5 being indicated by the same reference numerals. As shown, the second embodiment is basically similar in function and effect to the first embodiment except for the mode of carrying the rollers 14, 15 and 16 on the frame side rails 10 and 11. The conveyor rollers in this modification of the invention are disengageably borne on the rounded bottom edge of a generally U-shaped recess 30 formed in the side rails 10 and 11, whereby the conveyor rollers are immediately disengaged from the rails in the event the operator has his fingers or hems of coveralls caught in the conveyor rollers.

As shown, the main roller 14 has its shafts 14a each engaged at its tip with a bearing 31a which is disengageably supported on the rounded bottom edge of the U-shaped recess 30b slotted in the side rail and of the width substantially corresponding to the diameter of the shaft 14a. The coordinating roller 15 has its shaft 15a engaged at its tip with a bearing 23b which is disengageably supported on the rounded bottom edge of a generally U-shaped recess 30c slotted in the side rail and of the width substantially corresponding to that of the elongated slot 17 described in connection with the first embodiment. The free roller 16, similarly, has its shaft 16a each supported at its tip on a rounded bottom edge of a generally U-shaped recess 30a slotted in the side rail and of the width substantially corresponding to the diameter of the shaft 16a.

Each of the bearings 31b has provided therein a plurality of narrow holes 32 which are pierced longitudinally in the tubular wall of the bearing. Into one of the holes 32 is inserted the upper tip of the bracket 9, the projecting portion being capped by a plug 33 to prohibit the bracket tip to get out of the hole 32. It will be appreciated that the pressure exerted inbetween the belt and the pressure rollers can be adjusted by the selection of a proper hole out of the holes 32.

Figure 10:
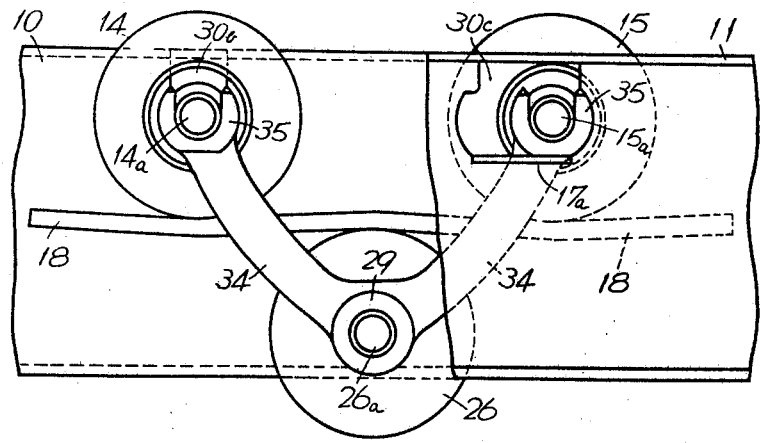
FIG. 10 is a fragmentary side view with a portion of the side rail removed for better illustration of another modification of the conveyor according to the invention.

FIG. 10 shows another modification of the second embodiment of the present invention, in which the V-shaped bracket 34 is made of a highly resilient plastics, which is connected integrally at its upper tips with the bearings 35. It will be appreciated that such arrangements of the bracket provide for similar effect and function to those attained by the first embodiment of the invention.

Figure 12:
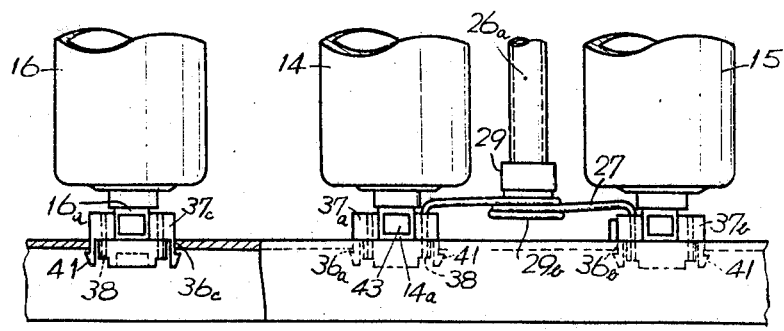
FIGS. 11 to 13 are a side view, top plan view and sectional view, respectively, showing the details of a further modification of the conveyor according to the invention.
Figure 11:
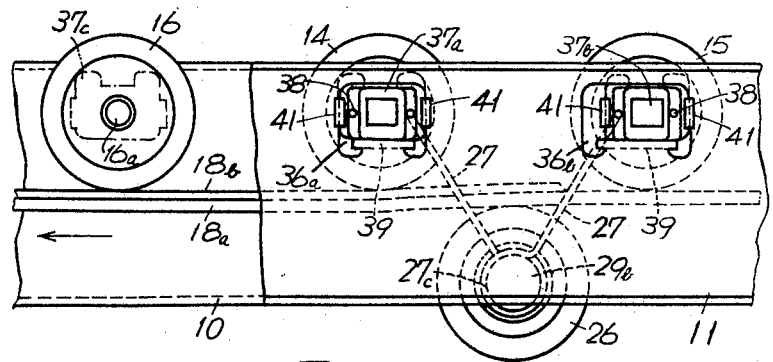
Figure 13:
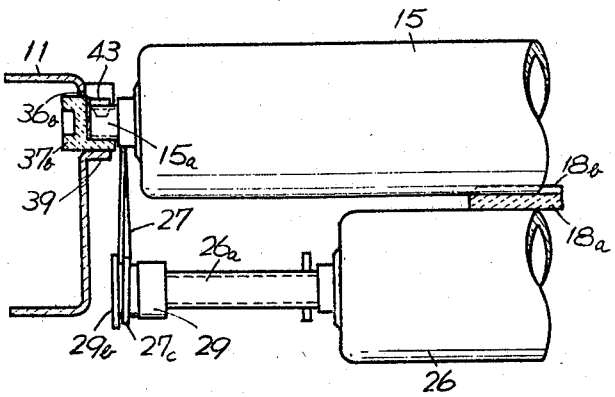
Figure 15:
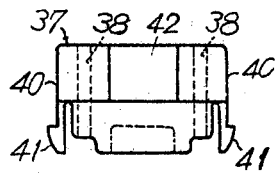
FIGS. 14 to 18 are a front view, top plan view, side view, rear view and sectional view, respectively, of the roller bearing used in the modification shown in FIGS. 11 to 13.
Figure 14:
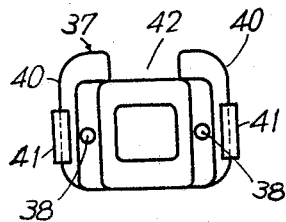
Figure 16:
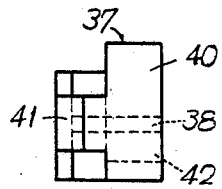
Figure 17:
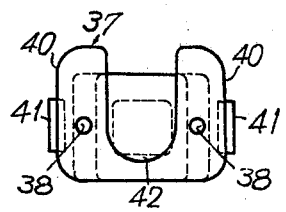
Figure 18:
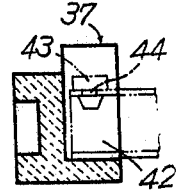

FIGS. 11 to 13 represent further modification of the invention, in which the shafts of the conveyor rollers are supported in rotatable engagement with generally rectangular slots 36a, 36b and 36c provided in the frame side rail 10 and 11. The slots 36a, 36b and 36c are rotatably engaged with the bearings 37a, 37b and 37c, respectively, which are mounted on the shafts 14a, 15a and 16a of the conveyor rollers 14, 15 and 16. The bearings 37a, 37b and 37c are made of a suitable plastic material and are configured all similarly. A spring bracket 27, which may be the same one as used in the first embodiment of the present invention, is mounted depending from and inbetween the main and coordinating rollers 14 and 15 through the connection by the bearings 37a and 37b which are mounted fast on the shafts 14a and 15a, respectively, of the rollers 14 and 15. The middle portion of the spring bracket 27 is formed substantially in a hoop with its diameter suited to wrap rotatably the outer periphery of the shafts 26a of the pressure roller 26, thereby to support the pressure rollers at the shafts thereof.

The slots 36a and 36c, as later to be described in further detail, are formed to have such widths as are substantially equal to those of the corresponding bearings and are arranged to determine the relative positions of the main and free rollers 14 and 16. The slot 36b on the other hand is formed in a longitudinally elongated rectangular shape of a width suited to slidably accommodate the bearing 37b of the coordinating roller 15, thereby permitting the shafts 15a of the rollers 15 to be moved forwardly and backwardly thereof by the spring action of the bracket 27. The lower edge of each of the slots 36a, 36b and 36c is bent inwardly and horizontally to form a support 39 for the shafts of the rollers, as shown in FIG. 13. The driving belt 13a used in this embodiment of the invention is illustrated to have a plurality of tie pads 13a which are attached fast on the upper surface of the belt 13a and which are arranged in suitably spaced relationship from each other. The use of tie pads in this embodiment is intended to add to the pressure exerted by the belt against the overlying rollers.

As illustrated on an enlarged scale in FIGS. 14 to 18, each of the bearings 37a, 37b and 37c has a side wall 40 of the width substantially corresponding to the width of each of the openings 36a, 36b and 36c, respectively, in the side rail, whereupon a pawl 41 is formed projecting outwardly from each of the side walls 40. The bearing has in its substantially middle portion a cavity 42 which is suitably formed to rotatably accommodate the coresponding roller shaft. Adjacent the cavity are pierced two narrow holes 38 which are adapted to receive the tips of the bracket 27.

Each of the bearings 37a, 37b and 37c is inserted into each of the corresponding openings 36a, 36b and 36c, respectively, the pawl 41 of the bearings side wall 40 being held in abutting engagement with the edge of the opening. The shaft of each roller is superposed on the bearing through a stopper 43 inserted into a hole 44 formed in the vicinity of the shaft end. The result of such construction is that the stopper 43 prohibits the roller shaft to rotate within the cavity of the bearing and to leave the bearing, inasmuch as it is in a normal position.

It will be appreciated that according to this embodiment of the invention an accidental damage to the operator is virtually avoided by the arrangement of the rollers which are raised in the event the operator is caught at his fingers or hems of the cloths in the rollers in operation. Moreover, the construction of the frame side rails which is provided with nothing other than the openings gives rise to the ruggedness of the frame construction in its entirety as compared to the one implemented in the embodiment depicted with reference to FIGS. 6 to 10. The provision of the pawls 41 at the upper portions of the side walls 40 of the bearing is apparently intended for increasing the tightness of the engagement of the bearing with the corresponding opening.

If it is desired to start and convey articles successively at predetermined intervals, the use of tie pads as attachments to the driving belt is extremely advantageous. As partially illustrated in FIG. 11, the tie pad 18b is secured fast on the upper surface of the driving belt 18a to provide the belt 18a with increased thickness. A plurality of tie pads having equal length are attached longitudinally to the belt 18a with predetermined spacing from each other. The spacing and the individual length of the tie pads should be determined in accordance with the dimensions of the articles to the handled and the length of intervals at which the articles are to be started and conveyed. The driving belt having such tie pads offers greater performance efficiency for the conveyance of numerous articles at regular intervals, because the overlying conveyor rollers are pressed upward only by the portions of the driving belt where the tie pads are attached thereto and are released of the driving engagement of the belt therewith by the portions of the belt where it is void of the tie pads. It will be appreciated that the availability of tie pads constitutes an important feature of the present invention, offering greater ease in temporary termination of the conveying operation.

While several embodiments of the invention have been described and shown herein, it will be understood that they are illustrative only.

What is claimed is:

1. An accumulating roller conveyor comprising: a frame including a pair of spaced parallel side rails each having provided therein a series of round and longitudinally elongated slots at regular intervals; a plurality of spaced parallel combination conveyor rollers including main rollers each having shafts projecting from both ends thereof and rotatably journalled at their end portions in the correspondingly shaped round slots in the side rails, coordinating rollers each having shafts projecting from both ends thereof and longitudinally slidably borne through tubular bearings of lubricous plastics wrapping securely the end portions of the last named shafts on the outwardly and horizontally bent bottom edges of the longitudinally elongated slots in the side rails and free rollers each having shafts projecting from both ends thereof and rotatably journalled at their end portions in the correspondingly shaped round slots in the side rails, each of the conveyor rollers substantially spanning the space between the side rails; an endless driving belt underlying the conveyor rollers; a plurality of spaced parallel pressure rollers underlying the driving belt and adapted to press the belt into driving engagement with the conveyor rollers and having shafts which project from both ends thereof and which are installed at their end portions with plugs of lubricous plastics each having a flange at the outer end thereof; and a plurality of generally V-shaped spring bracket each connected rotatably at its upper end portions with the shafts of the adjacent main and coordinating rollers and at its lower end portion with the shaft of the pressure roller below and between said adjacent main and coordinating rollers, each of said upper and lower end portions of the bracket being formed substantially in a hoop to slidably wrap the shaft of the corresponding roller at its outer periphery.

2. An accumulating roller conveyor comprising: a frame including a pair of spaced parallel side rails each having provided therein a series of U-shaped slots at regular intervals; a plurality of spaced parallel combination conveyor rollers including main rollers each having shafts projecting from both ends thereof and rotatably borne at their end portions on the round bottom portions of the U-shaped slots in the rails, coordinating rollers each having shafts projecting from both ends thereof and longitudinally slidably borne through tubular bearings of lubricous plastics wrapping securely the end portions of the last named shafts on the outwardly and horizontally bent bottom straight edges of the longitudinally elongated U-shaped slots in the side rails and free rollers each having shafts projecting from both ends thereof and rotatably borne at their end portions on the round bottom portions of the U-shaped slots in the side rails, each of the conveyor rollers substantially spanning the space between the side rails; an endless driving belt underlying the conveyor rollers; a plurality of spaced parallel pressure rollers underying the driving belt and adapted to press the belt into driving engagement with the conveyor rollers and having shafts which project from both ends thereof and which are installed at their end portions with plugs of lubricous plastics each having a flange at the outer end thereof; and a plurality of generally V-shaped spring bracket each connected rotatably at its upper end portions with the shafts of the adjacent main and coordinating rollers and at its lower end portion with the shaft of the pressure roller below and between said adjacent main and coordinating rollers, each of said upper and lower end portions of the bracket being formed substantially in a hoop to slidably wrap the shaft of the corresponding roller at its outer periphery.

3. An accumulating roller conveyor comprising: a frame including a pair of spaced side rails each having provided therein a series of U-shaped slots at regular intervals; a plurality of generally horse-shoe shaped roller bearings each having pierced therein a plurality of narrow holes; a plurality of combination conveyor rollers including main rollers each having shafts projecting from both ends thereof and rotatably borne at their end portions on the round bottom portions of the U-shaped recesses of the roller bearings which are secured in the U-shaped slots in the side rails, coordinating rollers each having shafts projecting from both ends thereof and rotatably borne at their end portions on the round bottom portions of the U-shaped recesses of the roller bearings which are longitudinally slidably mounted on the outwardly and horizontally bent straight edges of the longitudinally elongated U-shaped slots in the rails and free rollers each having shafts projecting from both ends thereof and rotatably borne at their end portions on the round bottom portions of the U-shaped slots in the side rails, each of the conveyor rollers substantially spanning the space between the side rails; an endless driving belt underlying the conveyor rollers; a plurality of spaced parallel pressure rollers underlying the driving belt and adapted to press the belt into driving engagement with the conveyor rollers and having shafts which project from both ends thereof and which are installed at their end portions with plugs of lubricous plastics each having a flange at the outer end thereof; and a plurality of generally V-shaped spring bracket each inserted rotatably at its upper end portions into one of the narrow holes pierced in each of the roller bearings accommodating the adjacent main and coordinating rollers and formed at its lower end portion in a hoop to wrap the outer periphery of the shaft of the pressure roller below and between said adjacent main and coordinating rollers.

4. An accumulating roller conveyor comprising: a frame including a pair of spaced parallel side rails each having provided therein a series of substantially U-shaped slots at regular intervals; a plurality of substantially V-shaped spring brackets of resilient plastic material each having upper end portions formed in U-shaped branches and a lowermost portion provided therein a round hole; a plurality of combination conveyor rollers including main rollers each having shafts projecting from both ends thereof and rotatably borne at their end portions on the round bottom portion of the one U-shaped branch of the bracket, which branch being secured in the U-shaped slot in the side rail, coordinating rollers each having shafts projecting from both ends thereof and rotatably borne at their end portions on the round bottom portion of the other U-shaped branch of the bracket, which branch being longitudinally slidably mounted on the outwardly and horizontally bent bottom edges of the longitudinally elongated U-shaped slots in the side rails and free rollers each having shafts projecting from both ends thereof and rotatably borne at their end portions on the round bottom portion of the U-shaped slots in the rails, each of the conveyor rollers substantially spanning the space between the side rails; an endless driving belt underlying the conveyor rollers; and a plurality of spaced parallel pressure rollers underlying the driving belt and adapted to press the belt into driving engagement with the conveyor rollers and having shafts which project from both ends thereof and each of which is rotatably inserted into the hole in the lowermost portion of the bracket.

5. An accumulating roller conveyor comprising: a frame including a pair of spaced side rails each having provided therein a series of substantially rectangular slots at regular intervals; a plurality of roller bearings each comprising side walls having the width substantially corresponding to the width of each of the slots in the side rails, pawls projecting outwardly from said side walls, a cavity formed to rotatably accommodate the shaft of said combination rollers and two narrow holes each pierced between the cavity and the side wall; a plurality of combination conveyor rollers including main, coordinating and free rollers each having shafts projecting from both ends thereof and rotatably journalled at their end portions in the cavities of the bearings, the opening for receiving the shafts of the coordinating rollers being longitudinally elongated to permit of longitudinal sliding movement of the coordinating rollers; an endless driving belt underlying the conveyor rollers; a plurality of spaced parallel rollers underlying the driving belt and adapted to press the belt into driving engagement with the conveyor roller and having shafts which project from both ends thereof and which are installed at their end portions with plugs of lubricous plastics each having a flange at the outer end thereof; and a plurality of generally V-shaped spring brackets each inserted rotatably at its upper end portions into one of the narrow holes pierced in each of the roller bearings accommodating the adjacent main and coordinating rollers and formed at its lower end portion in a hoop to wrap the outer periphery of the shaft of the pressure roller below and between said adjacent main and coordinating rollers.

References Cited

UNITED STATES PATENTS 3,255,865  6/1966  Sullivan _____ 198—127

EVON C. BLUNK, Primary Examiner

D. D. WATTS, Assistant Examiner